(12) United States Patent
Johnson

(10) Patent No.: US 6,374,861 B1
(45) Date of Patent: Apr. 23, 2002

(54) FLUID HANDLING PORT ARRAY

(75) Inventor: Kenneth Alan Johnson, Stockton, CA (US)

(73) Assignee: Chenand Corporation, San Jose, CA (US)

( * ) Notice: Subject to any disclaimer, the term of this patent is extended or adjusted under 35 U.S.C. 154(b) by 0 days.

(21) Appl. No.: 09/721,043

(22) Filed: Nov. 21, 2000

Related U.S. Application Data

(63) Continuation of application No. 09/177,856, filed on Oct. 23, 1998, now abandoned.

(51) Int. Cl.[7] .............................................. F16K 11/10
(52) U.S. Cl. ..................................... 137/884; 251/367
(58) Field of Search ........................... 137/884; 251/367

(56) References Cited

U.S. PATENT DOCUMENTS 2,834,368 A  *  5/1958  Gray ........................... 137/884
3,323,545 A  *  6/1967  Carls .......................... 137/884

OTHER PUBLICATIONS

What You Can Get in Manifolds, Hydraulics and PNeumatics, vol. 16, No. 11 (Nov., 1963,) pp. 88–89.*

* cited by examiner

*Primary Examiner*—John Fox
(74) *Attorney, Agent, or Firm*—Henneman & Saunders; Larry E. Henneman, Jr.

(57) ABSTRACT

A fluid handling port array includes at least one fluid conduction bore, a plurality of insert bores each intersecting at least one fluid conduction bore and being adapted to receive a configuration insert, a plurality of port bores each intersecting at least one of the fluid conduction bores for providing fluid access to the fluid conduction bores. The port array is configured by fixing configuration inserts in the insert bores. In a particular embodiment, the configuration inserts comprise device seats and are adapted to receive configuration devices such as a valves, caps or plugs. Alternatively, the configuration inserts, themselves, embody configuration devices.

39 Claims, 15 Drawing Sheets

FLUID HANDLING PORT ARRAY

RELATED APPLICATIONS

This application is a continuation of U.S. patent application Ser. No. 09/177,856, filed on Oct. 23, 1998, now ABN, by the same inventor, and which is incorporated herein by reference in its entirety.

BACKGROUND OF THE INVENTION

1. Field of the Invention

This invention relates generally to fluid handling systems, and more particularly to a novel port array which provides a configurable manifold system.

2. Description of the Background Art

Many modern manufacturing processes require complex fluid handling systems. For example, semiconductor processing systems typically include a number of supply tanks, reaction vessels, and waste containers, and employ a complex fluid handling system to direct reactants from the supply tanks to the reaction vessels, and to direct waste products from the reaction vessels to the waste containers.

Fluid handling systems are typically built around a multi-valve manifold, wherein fluid flow is controlled by selectively opening and closing the valves of the manifold to open a fluid path from a particular source to a particular destination. Known manifolds are assembled from individual valves and fittings by welding, compression fittings, or the like, and therefore suffer from the following disadvantages. First, because the manifold includes many individual parts, the assembly process is time consuming and prone to mistakes. Second, because the individual fittings must be large enough to make the necessary joints (e.g., welds or compression fittings), the valves must necessarily be spaced apart, so the overall size of the manifold becomes inconveniently large. Additionally, the large number of joints required to construct the manifold, increases the probability that the manifold will leak. Finally, once constructed known manifolds are very difficult to reconfigure if the needs of the system change (e.g., the addition of another supply vessel or waste container). This is particularly true when the manifold is welded together.

What is needed is a manifold having fewer parts than known manifolds. What is also needed is a manifold that is easy to assemble with a decreased probability of leaks. What is also needed is a manifold having a reduced size, for more convenient inclusion in fluid handling systems. What is also needed is a manifold that, once assembled, facilitates easy reconfiguration if the needs of the system in which it is incorporated change.

SUMMARY

The present invention overcomes the problems of the prior art by providing a configurable port array built in a port array block. The port array block includes a first fluid conduction bore and a first plurality of insert bores, each insert bore intersecting the first fluid conduction bore and adapted to receive a configuration insert. The block further includes a plurality of port bores, each intersecting the first fluid conduction bore for providing fluid access to the first fluid conduction bore. Optionally, the port array block includes a plurality of fluid conduction bores, a plurality of insert bores each intersecting at least one of the fluid conduction bores, and a plurality of port bores each intersecting at least one of the fluid conduction bores. Each insert bore is adapted to receive a configuration insert, and each port bore provides fluid access to at least one of the fluid conduction bores.

In a particular embodiment, two of the insert bores join to form a single bore through the port array block. In other words, two insert bores may be formed by a single bore through the block. Similarly, two port bores may be formed by a single bore through the block.

The port array further includes a plurality of configuration inserts, each fixed in one of the insert bores. In a particular embodiment, one or more of the configuration inserts are device seats, adapted to receive one of a number of various configuration devices including, but not limited to, a controlled valve, a check valve, a cap, and a plug. A particular embodiment of a device seat includes a body for partitioning the fluid conduction path into a first manifold and a second manifold, an internal chamber defined at least partially by the body, a first passageway connecting the first manifold with the internal chamber, a second passageway connecting the second manifold with the internal chamber, and an opening in the internal chamber defined by said body and adapted to receive a configuration device.

Alternatively, the configuration inserts may themselves embody configuration devices. For example, a configuration insert may embody a plug or a cap. A configuration insert may also include a body for partitioning a fluid conduction bore into a first manifold and a second manifold, and one or more passageways for interconnecting the first manifold, the second manifold, and/or the insert bore.

A method for manufacturing a port array block is also disclosed. The method includes the steps of providing a rectangular block, forming a first fluid conduction bore through the block, forming a plurality of insert bores in the block, and adapting each of the insert bores to receive a configuration insert. Each of the insert bores is formed so as to intersect the fluid conduction bore. One method further includes the step of forming a plurality of port bores, each intersecting the fluid conduction bore for providing fluid access to the fluid conduction bore. Optionally, two insert bores are formed by a single bore through the block, and/or two port bores are formed by a single bore through the block. A particular method includes the steps of forming a plurality of fluid conduction bores, a plurality of insert bores, and a plurality of port bores.

A method of manufacturing a port array from a port array block includes the steps of fixing a configuration insert in each of said insert bores. A particular method includes the steps of heating the block, cooling a configuration insert, inserting the configuration insert into an insert bore, and allowing the block and the configuration insert to reach thermal equilibrium.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a compact, configurable port array. Specifically, the present invention describes a port array block which is formed to accept a host of configuration inserts. The port array block and the configuration inserts facilitate the construction of a myriad of custom fluid handling manifolds, each having a relatively small number of parts and a relatively small size, as compared to prior art manifolds constructed from individual fittings. A method for fixing the inserts in the port array block is also disclosed.

In the following description, numerous specific details are set forth (e.g., construction materials and particular manifold configurations) in order to provide a thorough understanding of the invention. Those skilled in the art will recognize, however, that the invention may be practiced apart from these specific details. In other instances, well known details of fluid handling systems (e.g., the use and operation of controlled valves) have been omitted, so as not to unnecessarily obscure the present invention.

Figure 1:
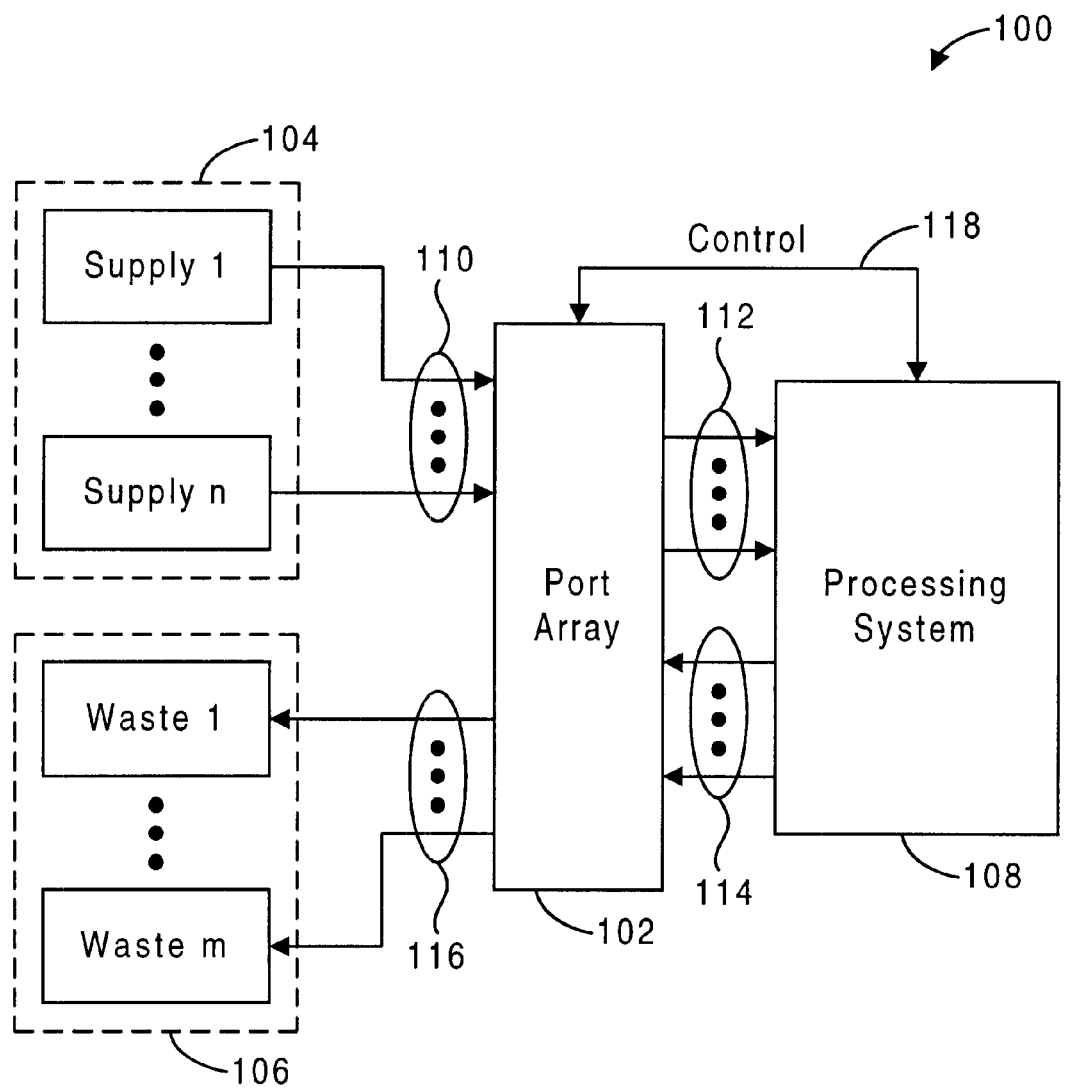
FIG. 1 is a block diagram of a processing system supported by a port array.

FIG. 1 is a block diagram showing a system 100 including a port array 102 interconnecting a plurality 104 of supply tanks 104(1–n), a plurality 106 of waste containers 106 (1–m), and a processing system 108. Supply fluids are transferred from supply tanks 104(1–n) to port array 102 via a first set 110 of fluid transfer lines, and from port array 102 to processing system 108 via a second set 112 of fluid transfer lines. Waste fluids are transferred from processing system 108 to port array 102 via a third set of fluid transfer lines, and from port array 102 to waste containers 106(1–m) via a fourth set of fluid transfer lines. In one application, system 100 is a semiconductor processing system, processing system 108 is a wafer chamber, supply containers 104(1–n) provide dopant gases, and waste containers 106 (1–n) collect the spent gases following their use in processing system 108.

A set of control lines 118 facilitates the transfer of control signals (e.g., to open and close valves) from processing system 108 to port array 102, and the transfer of feedback information (e.g., fluid pressure readings) from port array 102 to processing system 108. Those skilled in the art will recognize that control lines 118 may include any type of lines capable of conveying the desired information, including, but not limited to, electronic and pneumatic lines. The type of control lines employed is not considered to be an essential element of the present invention.

Figure 2:
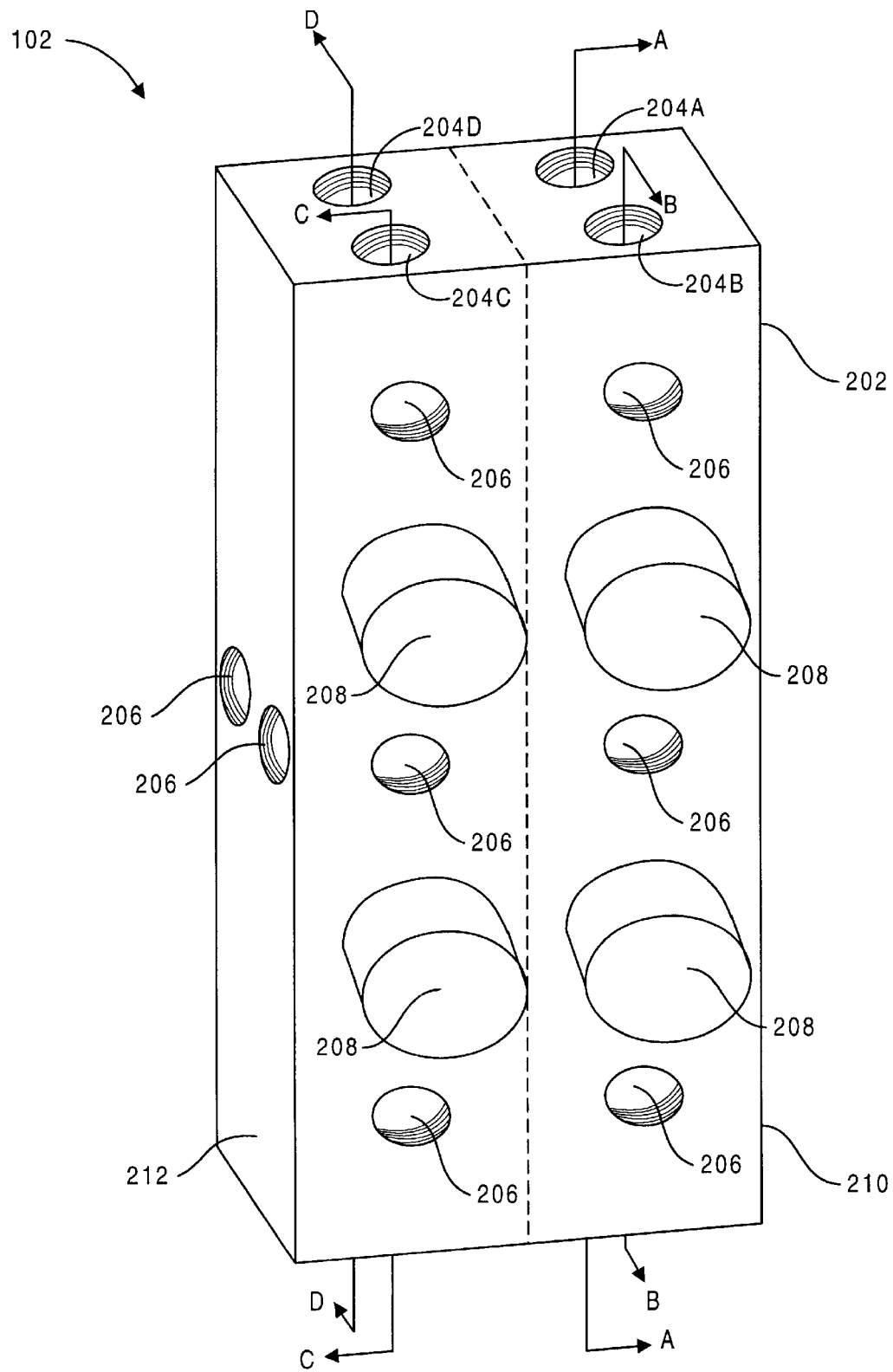
FIG. 2 is a perspective view of one embodiment of the port array of FIG. 1.

FIG. 2 is a perspective view of one embodiment of port array 102 constructed in a single port array block 202. A plurality of fluid conduction bores 204(A–D) through block 202 form internal chambers which are configured into manifolds as described below. Block 202 also includes a plurality of port bores 206, each intersecting at least one of fluid conduction bores 204 for providing fluid access to the internal chambers formed by fluid conduction bores 204. Each of port bores 206 is adapted (e.g., threaded) to be coupled to a fluid transfer line such as one of fluid transfer lines 112, 114, 116, or 118. Note that the external openings of fluid conduction bores 204 are also adapted to be coupled to fluid transfer lines, and thereby provide additional port bores.

Port array 102 further includes a plurality of valves 208. Each of valves 208 is mounted to a configuration insert (not visible in FIG. 2) which is fixed in one of a plurality of insert bores (not visible in FIG. 2) through block 202. Each insert bore intersects at least one of fluid conduction bores 204, and valves 208, responsive to control signals received via control lines 118, open and close to control fluid flow through port array 102.

Although it is not apparent from FIG. 2, port array 102 actually includes two separate subarrays 210 and 212. Subarray 210 is formed around fluid conduction bores 204A and 204B, and subarray 212 is formed around fluid conduction bores 204C and 204D. It should, therefore, be apparent to one skilled in the art that the number of fluid conduction bores, port bores, or insert bores is not an essential element of the invention. Rather, a port array according to the present invention may even be constructed around a single fluid conduction bore.

Figure 3A:
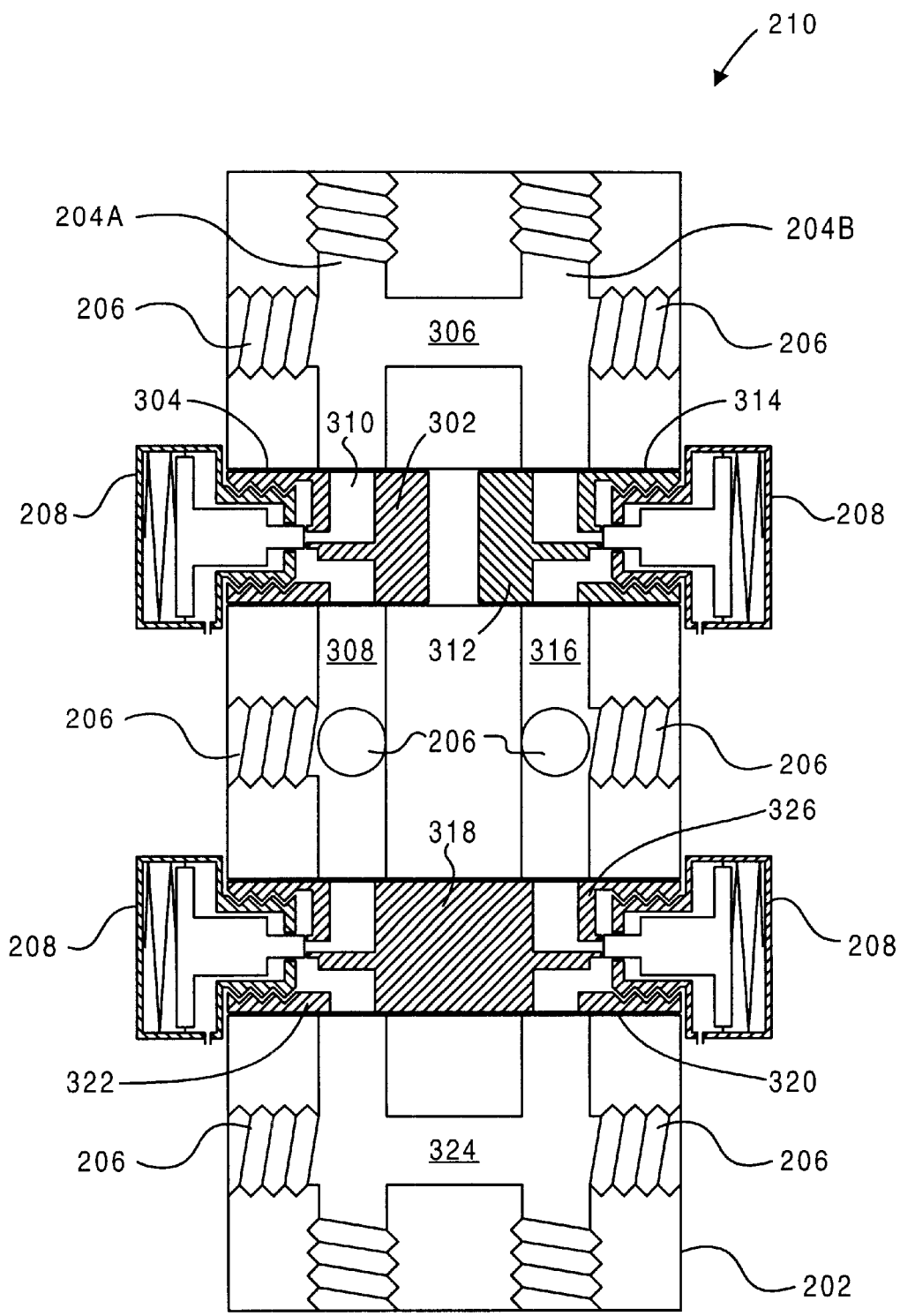
FIG. 3A is a cross-sectional view of the port array of FIG. 2, taken along line A—A.

FIG. 3A is a cross sectional view of port array 102 taken along line A—A of FIG. 2, showing subarray 210 in greater detail. As shown in FIG. 3A, port array 102 includes a first configuration insert 302 fixed in a first insert bore 304. Thus disposed, configuration insert 302 divides the intersected fluid conduction board 204A into a first manifold 306 and a second manifold 308. Configuration insert 302 defines a fluid path 310 connecting manifolds 306 and 308, and is adapted to provide a seat for valve 208 which selectively permits or blocks fluid flow through fluid path 310.

Port array 102 further includes a second configuration insert 312, which is substantially identical to configuration insert 302. Configuration insert 312 is fixed in second port bore 314 so as to divide second fluid conduction bore 204B into manifold 306 and a new manifold 316. In a particular embodiment, port bores 304 and 314 are formed by a single bore through block 202. In other words, port bores 304 and 314 join to form a single bore through block 202, that single bore intersecting both first fluid conduction bore 204A and second fluid conduction bore 204B.

Forming two port bores from a single bore facilitates the use of a single piece configuration insert which actually includes two configuration inserts, beneficially reducing the number of components necessary to construct port array 102. For example, a configuration insert 318 is fixed in a single port bore 320 through port array block 202. A first end 322 of configuration insert 318 partitions first fluid conduction bore 204A, forming manifolds 308 and 324. A second end 326 of configuration insert 318 partitions second fluid conduction bore 204B, forming manifolds 316 and 324. First end 322 and second end 326 of configuration insert 318 are similar in structure and function to configuration inserts 302 and 312.

Figure 3B:
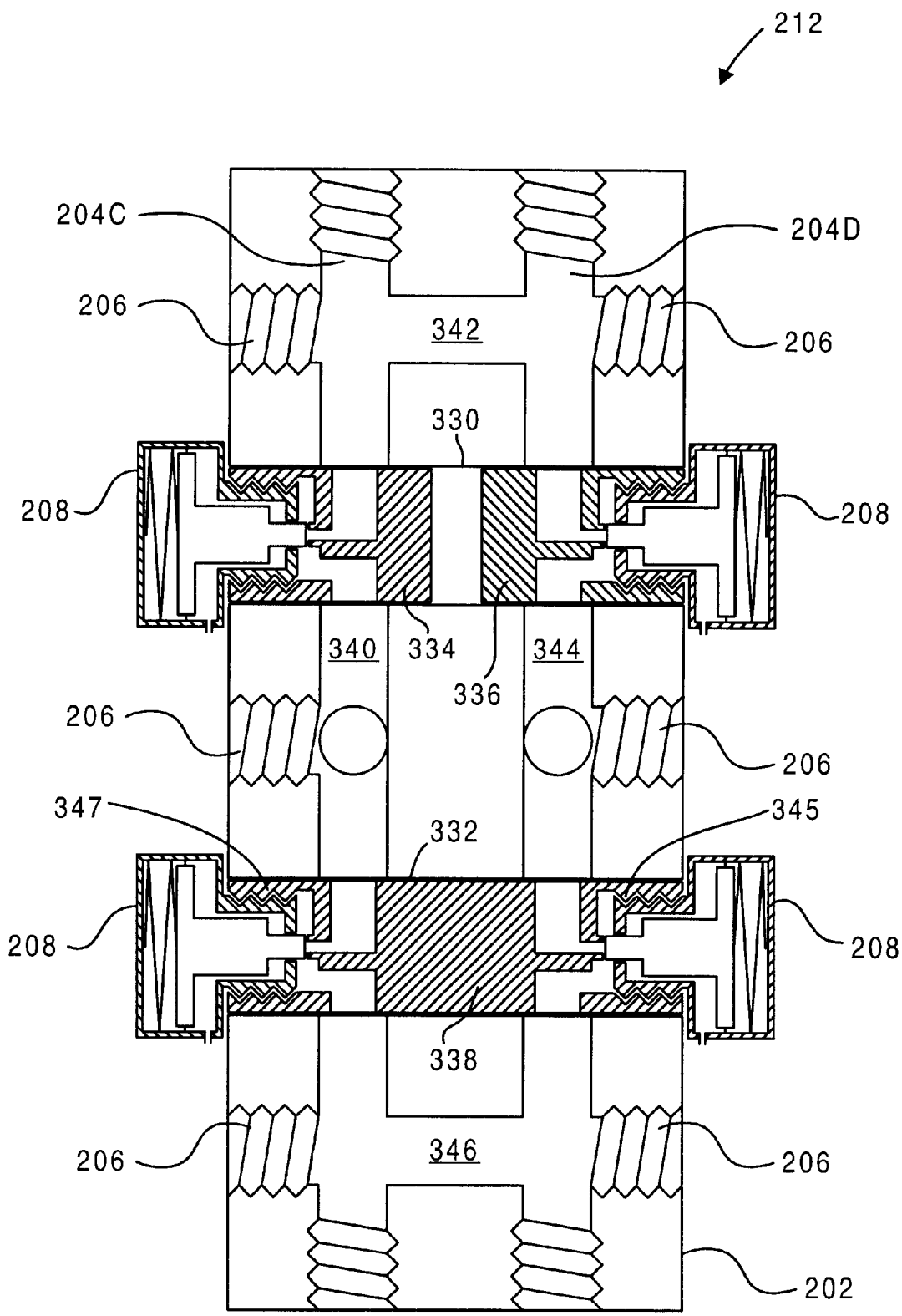
FIG. 3B is a cross-sectional view of the port array of FIG. 2, taken along line C—C.

FIG. 3B is a cross-sectional view of port array 102 taken along line C—C of FIG. 2, showing subarray 212 in greater detail. Block 202 further includes insert bores 330 and 332, each intersecting both of fluid conduction bores 204C and 204D, and adapted to receive configuration inserts 334, 336, and 338. Configuration insert 334 is fixed in one end of insert bore 330 to partition fluid conduction bore 204C into a first manifold 340 and a second manifold 342, and to provide a seat for one of valves 208, which selectively allows or obstructs fluid flow between manifolds 340 and 342, through configuration insert 334. Configuration insert 336 is fixed in the other end of insert bore 330 to partition fluid conduction bore 204D into second manifold 340 and a third manifold 344, and to provide a seat for another one of valves 208, which selectively allows or obstructs fluid flow between manifolds 342 and 344, through configuration insert 336.

Configuration insert 338 is fixed in insert bore 332. A first end 345 of insert 338 partitions fluid conduction bore 204D into third manifold 344 and a fourth manifold 346, and provides a seat for another one of valves 208, which controls fluid flow through first end 345 of configuration insert 338. A second end 347 of configuration insert 338 partitions fluid conduction bore 204C into first manifold 340 and fourth manifold 346, and provides a seat for another of valves 208, which controls fluid flow through second end 347 of configuration insert 338.

In this particular embodiment of the invention, subarray 212 is essentially a mirror image of subarray 210, which is shown in FIG. 3A. This should not, however, be understood in a limiting sense, because it is not essential that subarrays 210 and 212 be constructed and configured similarly. Indeed, one of the major advantages of the invention is the flexibility provided by the use of various configuration inserts, as will be discussed in greater detail below.

Figure 4A:
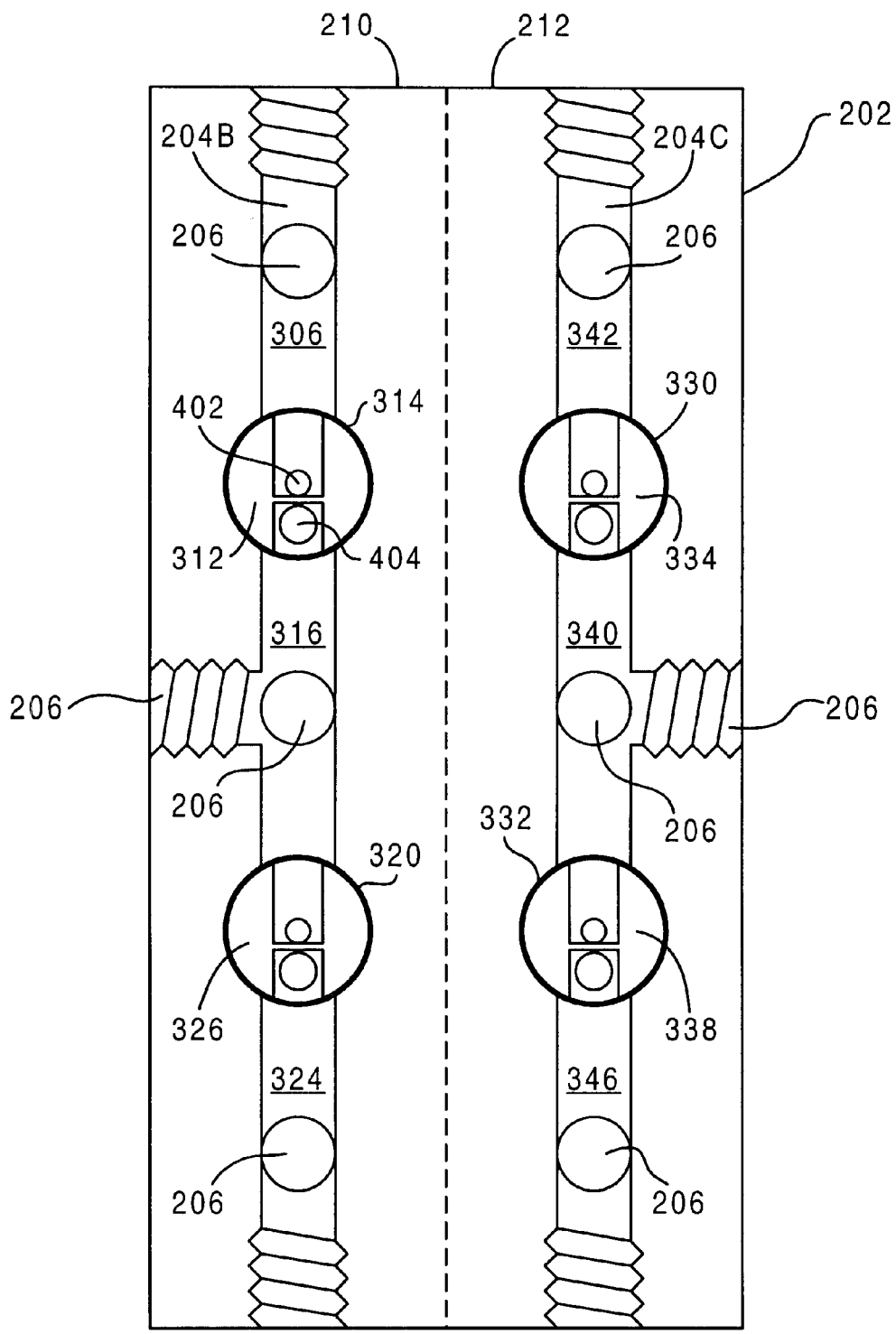
FIG. 4A is a cross-sectional view of the port array of FIG. 2, taken along line B—B.

FIG. 4A is a cross-sectional view of port array 102 taken along line B—B of FIG. 2. Note that configuration insert 312 has a first opening 402 and a second opening 404, with different diameters. The different diameters facilitate the use of high pressure gas on one side of insert 312. For example, the small diameter of first opening 402 would prevent a high pressure gas supply coupled to manifold 306 from hindering the operation of a valve 208 (not shown in FIG. 4A). The small diameter limits the force applied to the valve by the high pressure gas. To facilitate the coupling of a high pressure supply to manifold 316, insert 312 may simply be rotated 180 degrees prior to being fixed in insert bore 314.

Figure 4B:
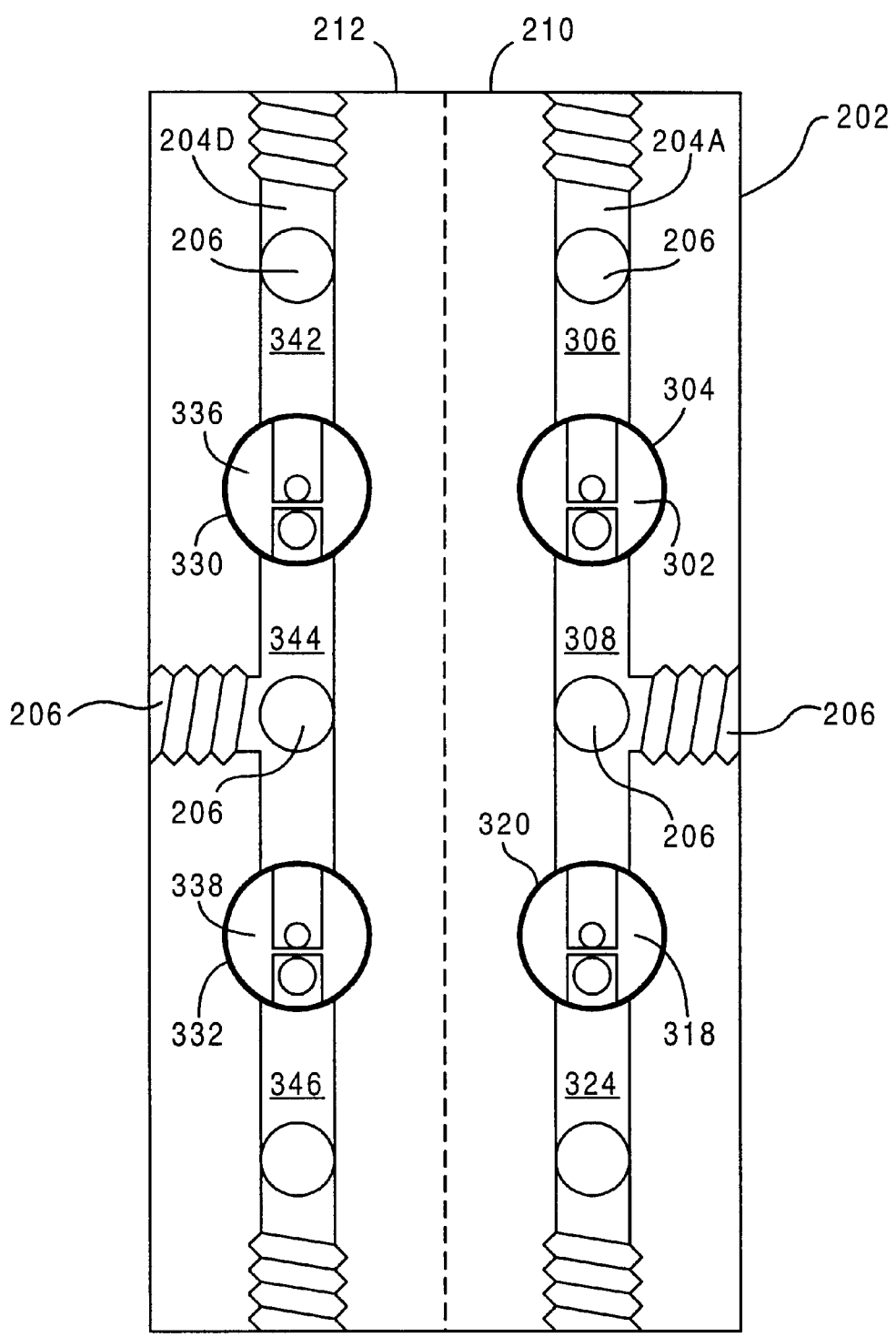
FIG. 4B is a cross-sectional view of the port array of FIG. 2, taken along line D—D.

FIG. 4B is a cross-sectional view of port array 102, taken along line D—D of FIG. 2. Taken together, FIG. 4A and FIG. 4B show that there are no internal connections between subarray 210 and subarray 212. Those skilled in the art will recognize, however, that the isolation of subarrays 210 and 212 is not an essential element of the present invention. For example, manifolds 306 and 342 could be joined by forming a single port bore through block 202, intersecting manifolds 306 and 342. Alternatively, any of the manifolds of the port array may be joined externally, by coupling a port bore 206 of one manifold to a port bore 206 of another manifold with a fluid conduction line (e.g., a pipe).

Port array 102 shown in FIGS. 2–4B lends itself to a particularly simply method of construction. In a particular embodiment, port array block 202 is formed from an aluminum block (2.5 in.×3.0 in.×6.25 in.). Fluid conduction bores 204A–204D are drilled straight through block 202. A first group of port bores 206 are also drilled straight through block 202. This first group includes the port bores that are drilled in a direction to intersect both fluid conduction bores 204A and 204D, or to intersect both fluid conduction bores 204C and 204D, and are drilled all the way through block 202. In contrast, the port bores that are drilled along a line intersecting both fluid conduction bores 204A and 204D, or a line intersecting both fluid conduction bores 204B and 204C are drilled only deep enough to intersect one of fluid conduction bores 204(A–D), thus maintaining the separation between subarrays 210 and 212. All of port bores 206 and the openings of all of the fluid conduction bores 204 are tapped for standard ⅜ in. national pipe threads (npt).

In this particular embodiment, all insert bores are formed by boring straight through block 202, as shown in FIGS. 3A and 3B but this is not an essential element of the present invention. The insert bores are adapted to receive configuration inserts, and the configuration inserts are fixed in the insert bores as follows. Each of the insert bores is drilled as a 1 in. "true bore" (i.e., manufacturing tolerance of +0.0004 in.). The inserts are manufactured from stainless steel (e.g., 304 ss) to have a cylindrical body 1 in. in diameter with a tolerance of ±0.0002 in. Block 202 is heated (e.g., in a convection oven) and the configuration inserts are cooled (e.g., in liquid nitrogen). The cooled configuration inserts are then placed in the heated block and oriented as desired for the particular configuration. As the block cools and the inserts warm, the insert bores shrink and the configuration inserts expand, forming a fluid tight seal between block 202 and the inserts. When the block and the inserts reach thermal equilibrium, the inserts are fixed in block 202. Those skilled in the art will recognize that this method, while advantageous, is not an essential element in the method of constructing port array 102, and that alternate means of fixing the configuration inserts in block 202 (e.g., threading or welding) may be employed without departing from the scope of the present invention.

FIGS. 5A–5D show an exemplary chemical supply system 500 constructed around port array 102, in various stages of operation. Chemical supply system 500 includes a compressed gas supply tank 502, a liquid chemical supply tank 504, a first pressure vessel 506, and a second pressure vessel 508, all coupled, via selected ones of port bores 206, to port array 102. Compressed gas supply tank 502 is coupled to manifold 306, liquid chemical supply tank 504 is coupled to manifold 342, first pressure vessel 506 is coupled via a gas line 510 to manifold 316 and via a liquid line 512 to manifold 340, and second pressure vessel 508 is coupled via a gas line 514 to manifold 308 and via a liquid line 516 to manifold 344. Chemical supply system 500 provides liquid chemical to a processing system (not shown) via a supply line 518 coupled to manifold 346. Manifold 324 is coupled to an open vent line 520. The unused port bores are plugged, as indicated by the dark blocks in FIGS. 5A–5F.

Supply system 500 provides liquid chemical from first pressure vessel 506 and second pressure vessel 508 in alternating fashion, filling and pressurizing one of pressure vessels 506 and 508 while providing liquid chemical from the other. Valves 208 of port array 102 are substantially identical to each other in structure and function, but are labeled individually as valves 208A–208H to facilitate clear explanation of the operation of supply system 500. An "X" in a particular one of valves 208A–208H indicates that the valve is closed, whereas an arrow through a particular one of valves 208A–208H indicates that the valve is open.

Figure 5A:
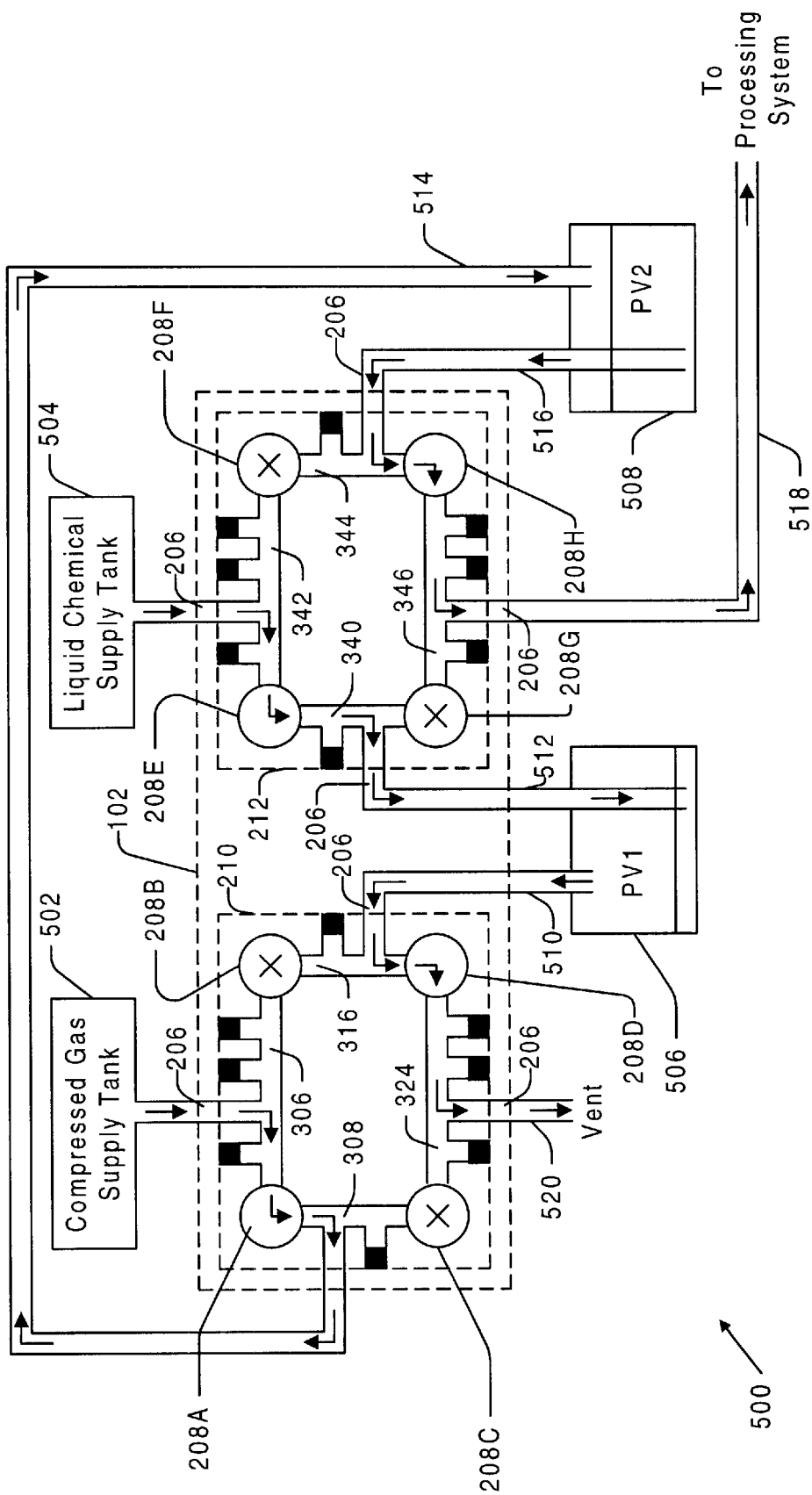
FIG. 5A is a schematic diagram of a particular system constructed around the port array of FIG. 2, in an initial operational state.

FIG. 5A shows supply system 500 filling first pressure vessel 506 and providing liquid chemical from pressurized second pressure vessel 508. First pressure vessel 506 is filled as follows. Valve 208D is opened to vent first pressure vessel 506 through manifold 316, valve 208D, manifold 324, and vent line 520. Valves 208B and 208C remain closed to prevent the escape of compressed gas from compressed gas supply tank 502. Valve 208E is opened to allow liquid chemical to gravity feed through manifold 342, through valve 208E, through manifold 340, and via line 512 into first pressure vessel 506.

Second pressure vessel 508 provides liquid chemical as follows. Second pressure vessel 508 is pressurized by opening valve 208A to allow compressed gas to flow from compressed gas supply tank 502, through manifold 306, valve 208, manifold 308, gas line 514, and into second pressure vessel 508. The liquid chemical then flows under pressure from second pressure vessel 508, through liquid line 516, manifold 344, valve 208H, manifold 346, and out through supply line 518 to the processing system. Valves 208F and 208G are closed to prevent the flow of the pressurized liquid back into liquid chemical supply tank 504 or into first pressure vessel 506, thus diminishing the flow to the processing system.

Figure 5B:
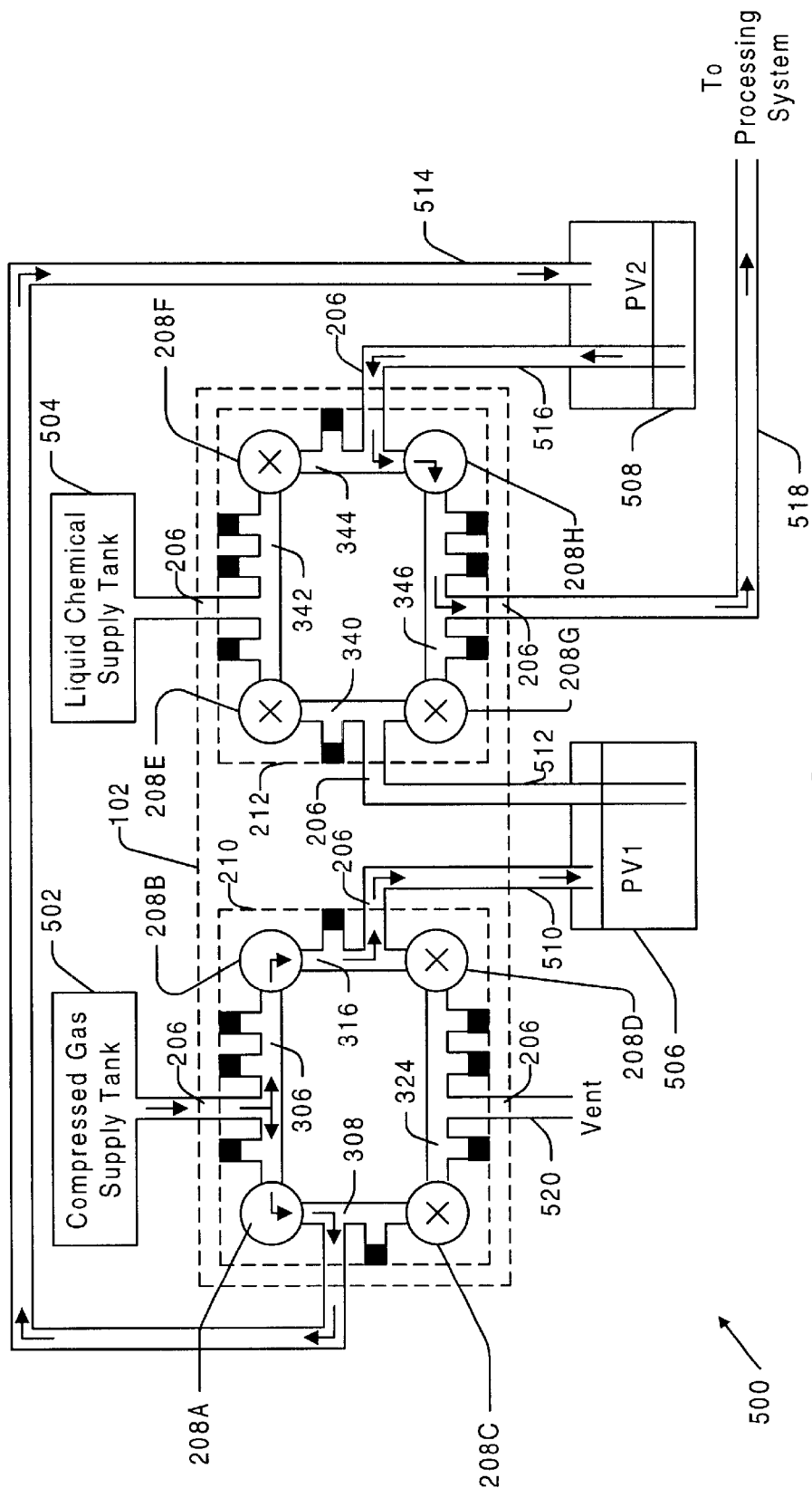
FIG. 5B is a schematic diagram of the system of FIG. 5A, in a second operational state.

FIG. 5B shows the next step in the operation of chemical supply system 500. Once first pressure vessel 506 is filled to a predetermined level, valve 208E is closed to stop the flow of liquid chemical into first pressure vessel 506, and valve 208D is closed to seal first pressure vessel 506. Then, valve 208B is opened to allow compressed gas to flow from compressed gas supply tank 502, through manifold 306, valve 208B, manifold 316, and via line 510 into first pressure vessel 506. Second pressure vessel 508 continues to provide liquid chemical to the processing system, but first pressure 506 is now full, pressurized, and ready to provide the liquid chemical to the processing system when the liquid in second pressure vessel 508 is depleted to a predetermined level.

Figure 5C:
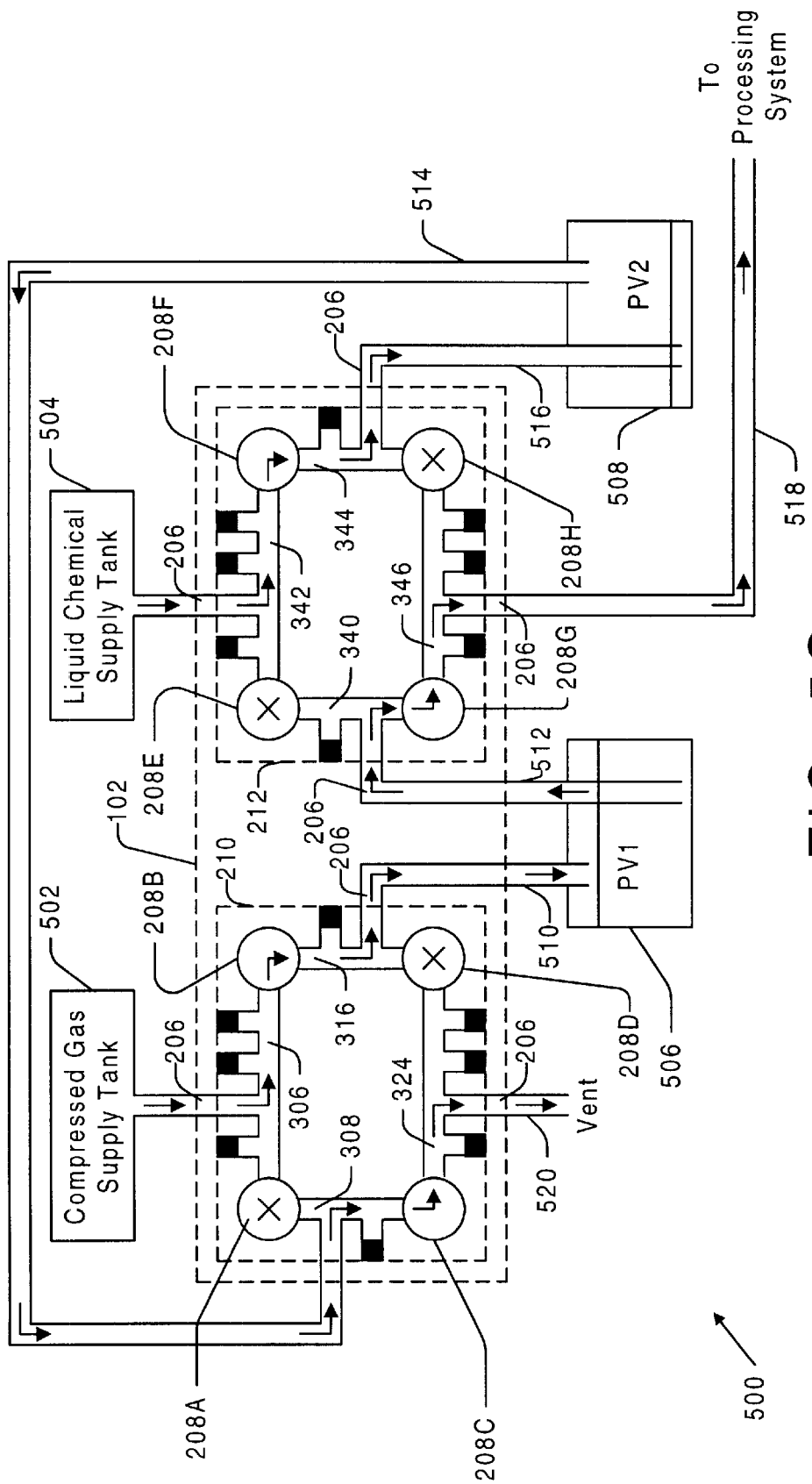
FIG. 5C is a schematic diagram of the system of FIG. 5A, in a third operational state.

FIG. 5C shows chemical supply system 500 after second pressure vessel 508 has been depleted to a predetermined level. Valve 208H is closed and valve 208G is opened, so that first pressure vessel 506 provides liquid chemical through line 512, manifold 340, valve 208G, manifold 346, and line 518 to the processing system. Thus, the provision of liquid chemical to the processing system is uninterrupted.

Once first pressure vessel 506 is providing liquid chemical to the processing system, second pressure vessel 508 may be refilled and pressurized. Valve 208A is closed and valve 208C is opened to vent second pressure vessel 508 through line 514, manifold 308, valve 208C, manifold 324, and vent line 520. Then, valve 208F is opened, allowing liquid chemical to gravity feed from liquid chemical supply tank 504, through manifold 342, valve 208F, manifold 344, and line 516 into second pressure vessel 508.

Figure 5D:
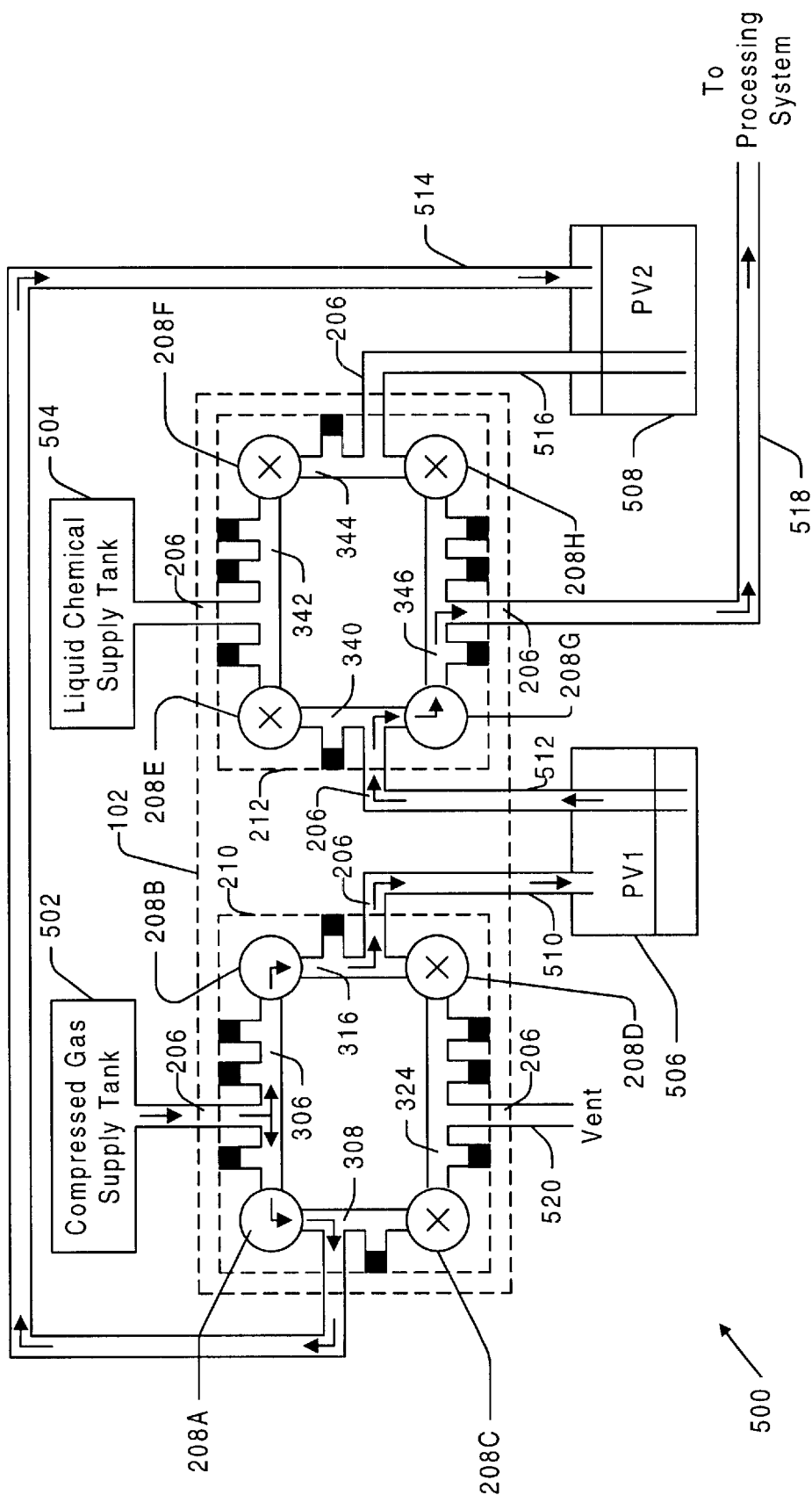
FIG. 5D is a schematic diagram of the system of FIG. 5A, in a fourth operational state.

FIG. 5D shows chemical supply system 500 after the level of liquid chemical in second pressure vessel 508 reaches a predetermined fill level. Valve 208F is closed to prevent additional liquid chemical from feeding into second pressure vessel 508 and to seal second pressure vessel 508. Valve 208C also closes to seal second pressure vessel 508 from vent line 520. Once second pressure vessel 508 is full of liquid chemical and sealed, valve 208A is opened allowing compressed gas to flow from compressed gas supply tank 502, through manifold 306, valve 208A, manifold 308, and line 514 into second pressure vessel 508. First pressure vessel 506 continues to provide liquid chemical to the processing system, but second pressure 508 is now full, pressurized, and ready to provide the liquid chemical to the processing system when the liquid in first pressure vessel 506 is depleted to a predetermined level. When the liquid in first pressure vessel 506 is depleted to the predetermined level, chemical supply system 500 reverts to the operating state shown in FIG. 5A.

Figure 6A:
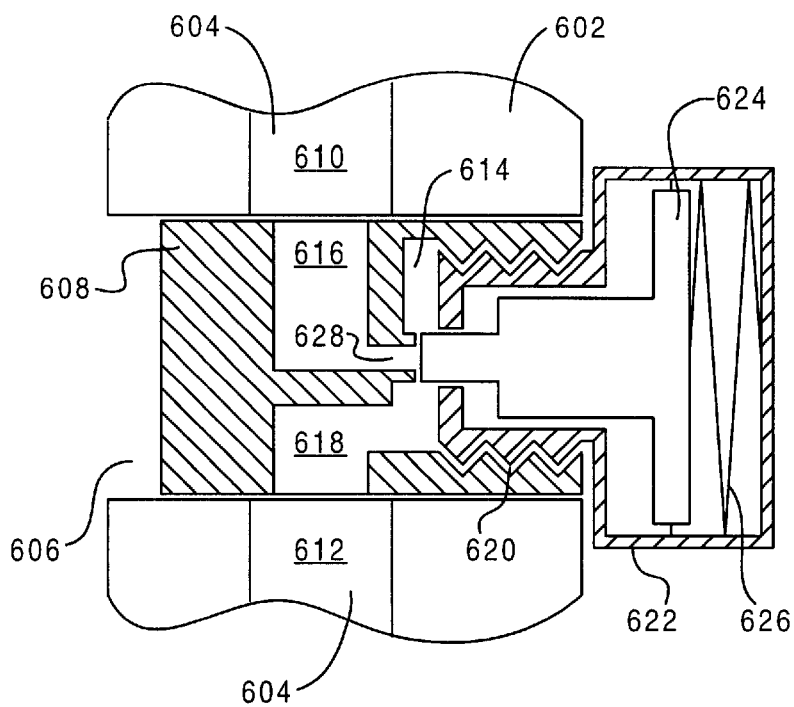
FIG. 6A is a cross-sectional view of a configuration device seated in a device seat fixed in an insert bore of the port array shown in FIG. 2.

FIGS. 6A–6D illustrate how the flexibility of a port array such as port array 102 can be greatly expanded through the use of various configuration devices. FIG. 6A shows a portion of a port array block 602 including a fluid conduction bore 604 and an insert bore 606 intersecting fluid conduction bore 604. A configuration insert 608 is fixed in insert bore 606. The body of configuration insert 608 partitions fluid conduction bore 604 into a first manifold 610 and a second manifold 612, and defines an internal chamber 614. The body of configuration insert 608 further defines a first passageway 616 and a second passageway 618, connecting first manifold 610 and second manifold 612, respectively, with internal chamber 614. The body of configuration insert 608 further defines an opening 620 into internal chamber 614, opening 620 being adapted (e.g., threaded) to receive a configuration device 622. Configuration insert 608, therefore, functions as a device seat, which can receive a wide variety of configuration devices.

Configuration device 622 is a check valve including a stopper 624 and a biasing member 626. Biasing member 626 biases stopper 624 to occlude an opening 628 between passageway 616 and internal chamber 614. The strength of biasing member 626 is selected to allow a predetermined fluid pressure in passageway 616 to displace stopper 624, facilitating one-way fluid flow from passageway 616, through opening 628, and into passageway 618. Because fluid pressure in passageway 618 does not exert pressure on stopper 624 in a direction required to displace stopper 624 toward biasing member 626, check valve 622 prevents the flow of fluid from passageway 618 to passageway 616, even when the fluid in passageway 618 is under pressure.

Figure 6B:
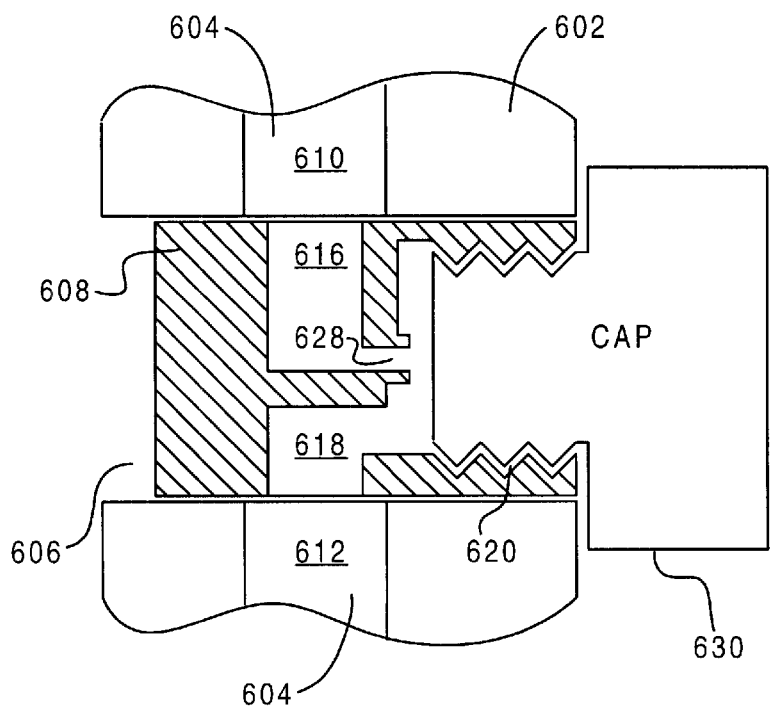
FIG. 6B is a cross-sectional view of another configuration device seated in a device seat fixed in an insert bore of the port array shown in FIG. 2.

FIG. 6B is a cross-sectional view showing another configuration device, cap 630, seated in configuration insert 608. Cap 630 functions to join manifold 610 and 612 into a single manifold, by closing opening 620 and leaving opening 628 unobstructed. The use of cap 630 would be desirable where a single manifold with a greater number of port bores 206 (FIG. 2) is required.

Figure 6C:
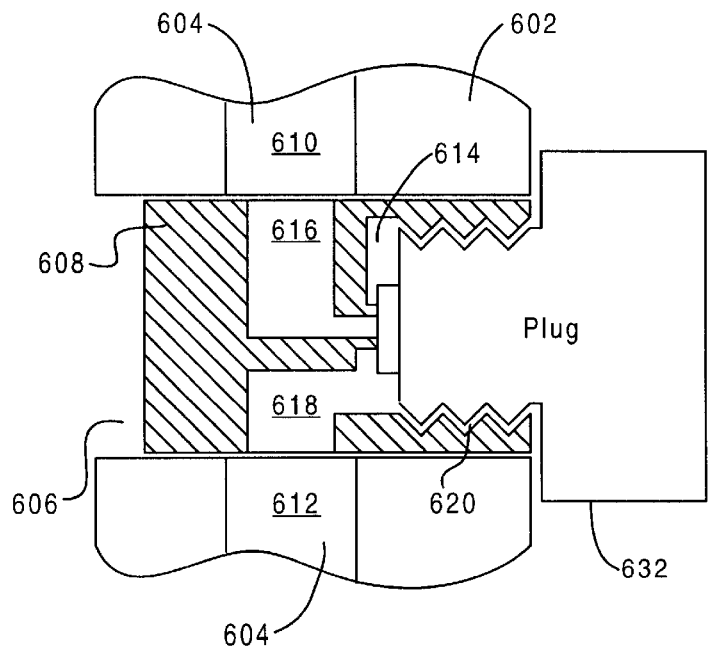
FIG. 6C is a cross-sectional view of another configuration device seated in a device seat fixed in an insert bore of the port array shown in FIG. 2.

FIG. 6C is a cross-sectional view showing a plug 632 seated in configuration device 608. Plug 630 functions to invariably separate manifolds 610 and 612. Plugs such as plug 632 may be used, therefore, to divide a single port array into multiple subarrays. Additionally, both cap 630 and plug 632 are less expensive than using a normally open valve or a normally closed valve to achieve the same ends.

Figure 6D:
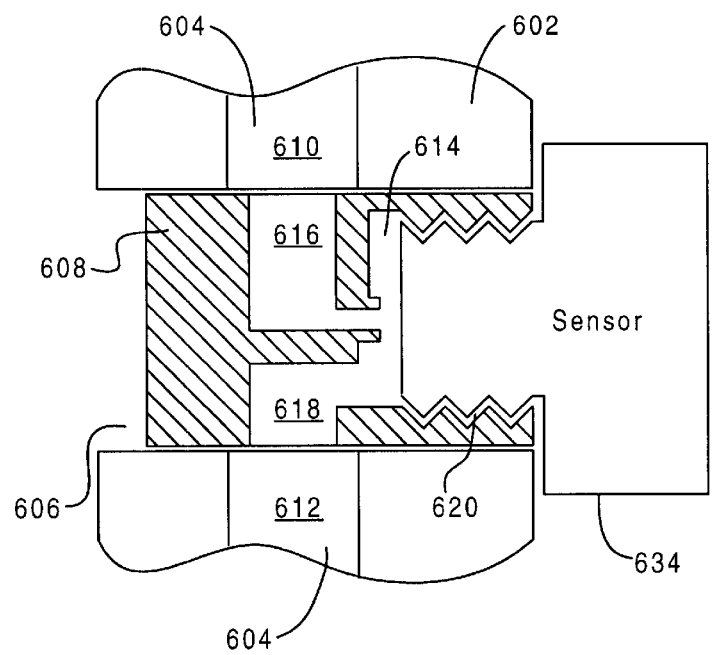
FIG. 6D is a cross-sectional view of another configuration device seated in a device seat fixed in an insert bore of the port array shown in FIG. 2.

FIG. 6D shows a sensor (e.g., a pressure sensor or heat sensor) 634 seated in configuration insert 608. Sensor 634 functions to generate a signal responsive to a physical property of a fluid in internal chamber 614. In one embodiment, sensor 634 is a direct mechanical sensor (e.g., a spring loaded pressure gauge). Alternatively, sensor 634 includes a transducer for generating a signal (e.g., electrical or optical) corresponding to a physical property (e.g., pressure, temperature, capacitance, etc.) of the fluid in internal chamber 614.

As the above examples show, device seat type configuration inserts greatly enhance the adaptability of a port array. Additionally, the configuration devices may be changed or rearranged by a user without special tools or processes. Where adaptability is not required, however, the complexity and number of parts (and the associated risk of leaks) may be reduced by using configuration inserts which embody configuration devices as opposed to device seats.

Figure 7A:
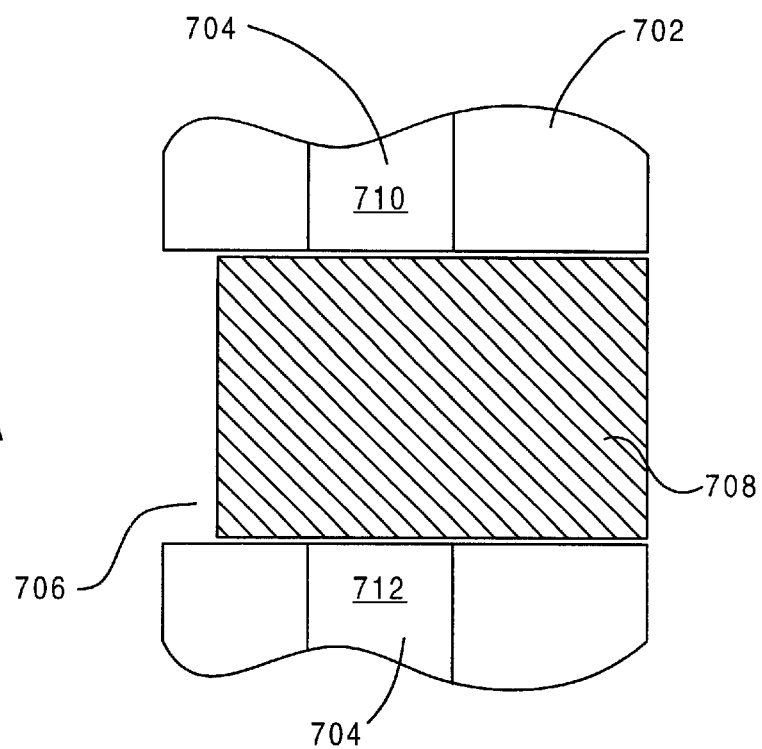
FIG. 7A is a cross-sectional view of an alternate configuration insert fixed in an insert bore of a port array.

FIG. 7A shows a portion of a port array block 702 including a fluid conduction bore 704 and an insert bore 706 intersecting fluid conduction bore 704. A configuration insert 708 is fixed in insert bore 706, and partitions fluid conduction bore 704 into a first manifold 710 and a second manifold 712. Configuration insert 708 is a plug, which prevents fluid flow between manifold 710 and manifold 712. Configuration insert 708 is similar in function to the combination of plug 632 and insert 608 (FIG. 6C), but because insert 708 is a single piece, it is less expensive to manufacture and less prone to leaks.

Figure 7B:
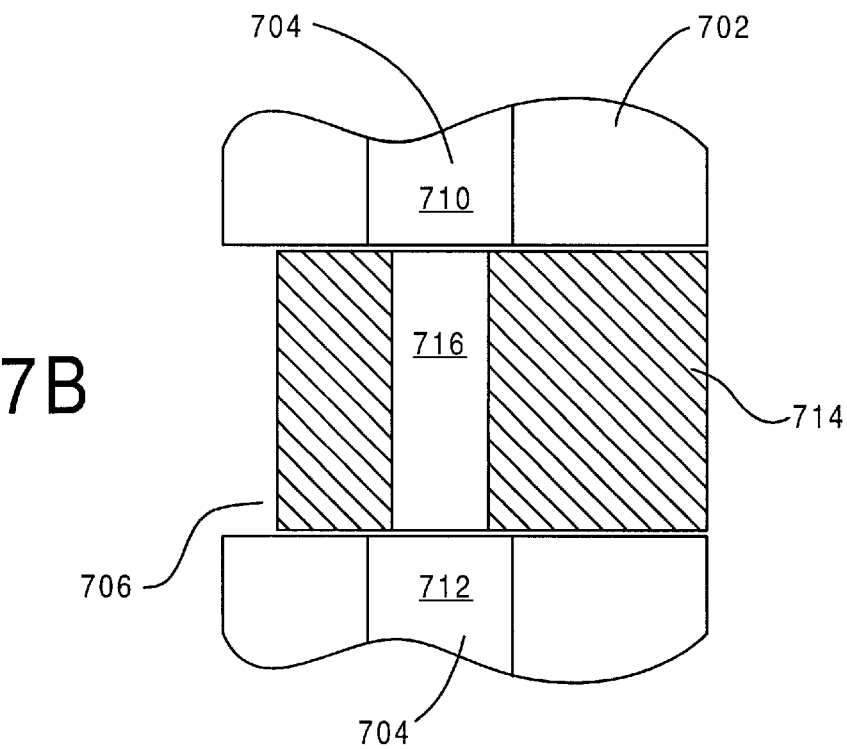
FIG. 7B is a cross-sectional view of another configuration insert fixed in an insert bore of the port array shown in FIG. 7A.

FIG. 7B shows a configuration insert 714 fixed in insert bore 706. Configuration insert 714 seals insert bore 706, but includes a passageway 716 connecting manifold 710 and 712 to form a single manifold. Configuration insert 714 is similar in function to the combination of cap 630 and insert 608 (FIG. 6B), but because insert 714 is a single piece, it is less expensive to manufacture and less prone to leaks.

Figure 7C:
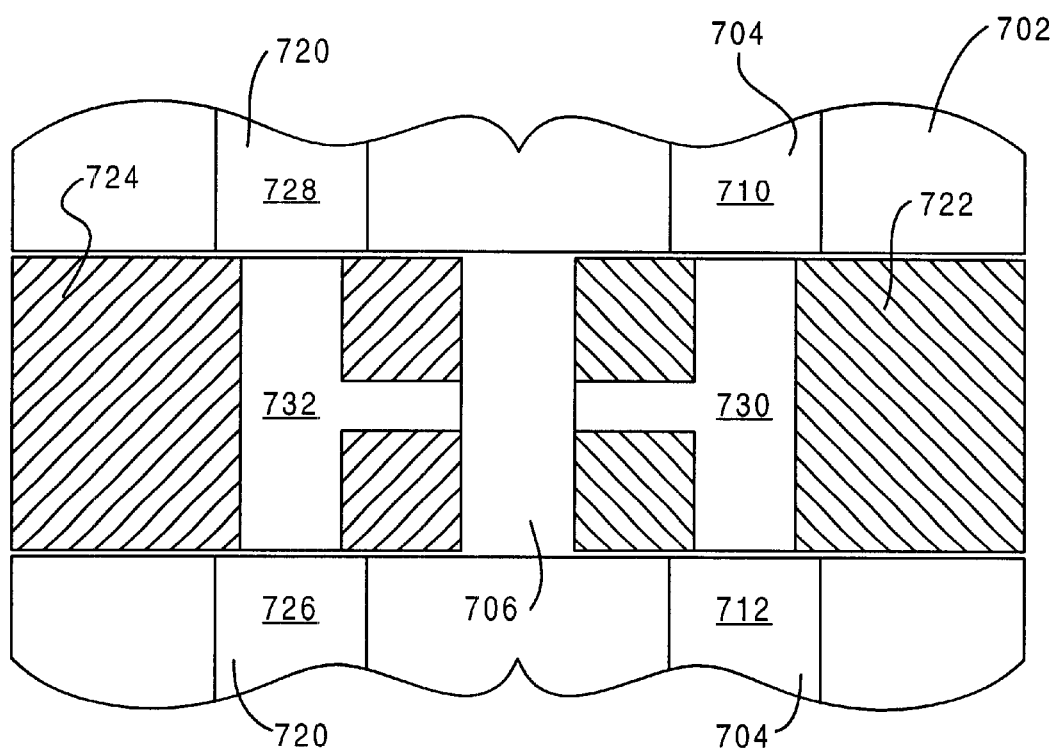
FIG. 7C is a cross-sectional view of two configuration inserts fixed in an insert bore of the port array shown in FIG. 7A.

Configuration inserts can also be used to interconnect separate fluid conduction bores. For example, FIG. 7C shows an extended portion of port array block 702 to further include a second fluid conduction bore 720, also intersecting insert bore 706. Configuration insert 722 is fixed in insert bore 706 to partition fluid conduction bore 704 into manifolds 710 and 712, and configuration insert 724 is fixed in insert bore 706 to partition fluid conduction bore 720 into manifolds 726 and 728. Configuration inserts 722 and 724 include T-shaped passageways 730 and 732, respectively, such that manifolds 710, 712, 726, and 728 can all be joined through insert bore 706 to form a single manifold. Those skilled in the art will recognize that configuration inserts 722 and 724, as well as the other described inserts, may be formed together as a single piece configuration insert.

Figure 8:
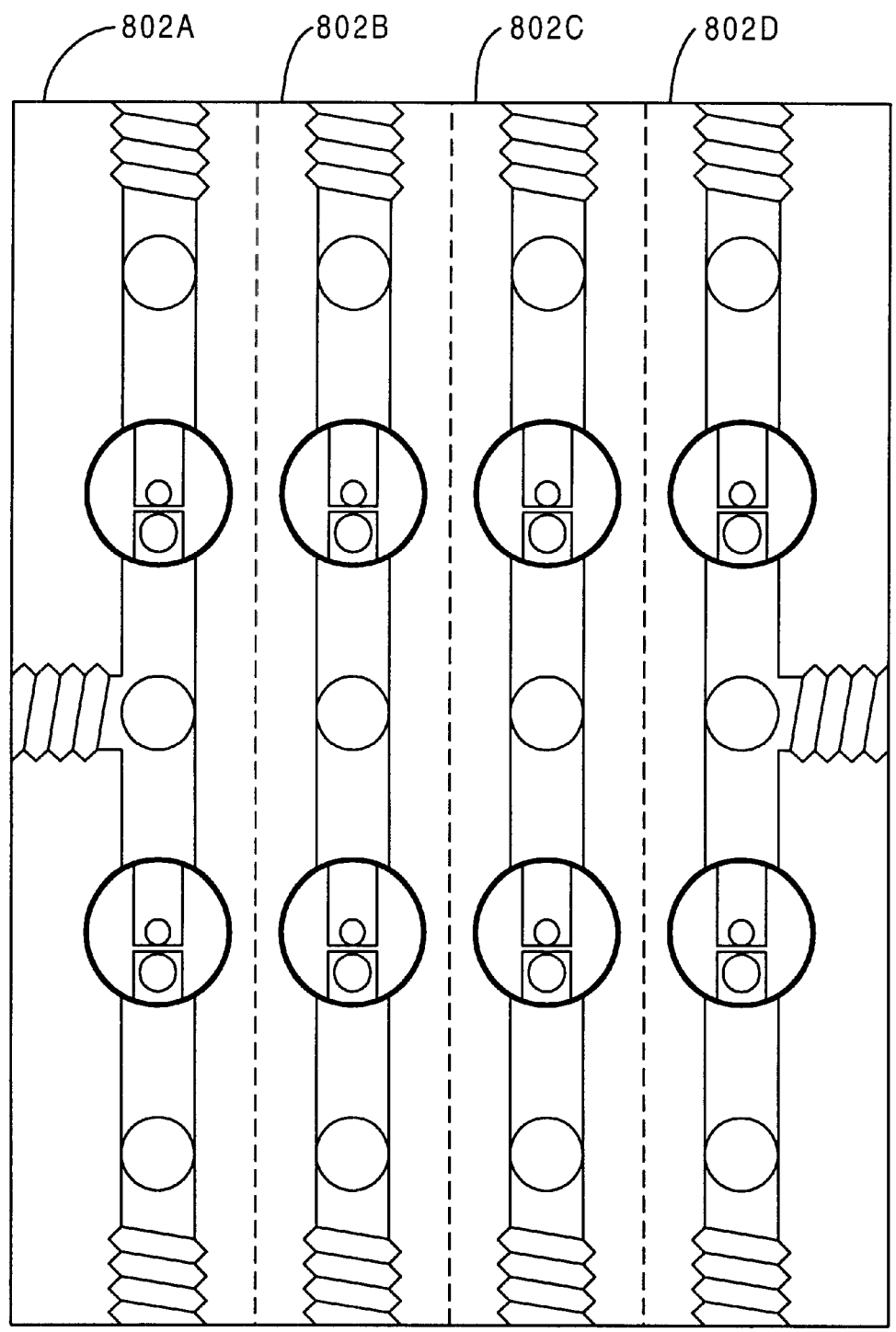
FIG. 8 is a cross-sectional view of an alternate port array according to the present invention.

While port array 102 is shown in FIG. 4A and FIG. 4B to include only two separate subarrays 210 and 212, port arrays containing a greater number of subarrays may be constructed in a single port array block. For example, FIG. 8 shows a cross-sectional view of a port array 800, that includes four individual subarrays 802A–802D. Considering the adaptability provided by the use of a variety of configuration inserts and devices as described above, it should be apparent to those skilled in the art, in light of this disclosure, that a single block port array may be constructed and configured according to the present invention to satisfy the requirements of a vast majority of all fluid handling systems.

The description of particular embodiments of the present invention is now complete. Many of the described features may be substituted, altered or omitted without departing from the scope of the invention. For example, configuration inserts may be fixed in the insert bores of port array blocks using methods (e.g., threading or welding) other than those described. Additionally, configuration inserts and devices other than those described above may be employed in conjunction with the port array of the present invention. Further, the use of the present invention is not limited to manufacturing applications. Rather, the invention may be employed wherever it is desirable to provide a configurable fluid handling system in a compact space, including but not limited to scientific instrumentation.

I claim:

1. A port array block comprising:
    a first fluid conduction bore at least partially through said block;
    a plurality of insert bores, each intersecting said first fluid conduction bore and adapted to receive a configuration insert; and
    a plurality of port bores for providing fluid communication with said first fluid conduction bore, at least one of said first plurality of port bores intersecting said first fluid conduction bore between an adjacent pair of said insert bores.

2. A port array block according to claim 1, wherein at least one of said first plurality of port bores intersects said first fluid conduction bore between each adjacent pair of said insert bores.

3. A port array block according to claim 1, further comprising:
    a second fluid conduction bore at least partially through said block;
    a second plurality of insert bores, each intersecting said second fluid conduction bore and adapted to receive a configuration insert; and
    a second plurality of port bores for providing fluid communication with said second fluid conduction bore, at least one of said second plurality of port bores intersecting said second fluid conduction bore between an adjacent pair of said second plurality of insert bores.

4. A port array block according to claim 3, wherein at least one of said first plurality of insert bores and an associated one of said second plurality of insert bores are embodied in a single bore of uniform diameter straight through said block.

5. A port array block according to claim 3, wherein each of said first plurality of insert bores and an associated one of said second plurality of insert bores are embodied in a single bore of uniform diameter straight through said block.

6. A port array block according to claim 3, further comprising at least one interconnecting port bore intersecting said first fluid conduction bore and said second fluid conduction bore, thereby forming a manifold with the intersected portions of said first fluid conduction bore and said second fluid conduction bore.

7. A port array block according to claim 6, further comprising:
    at least one interconnecting port bore intersecting said first fluid conduction bore and said second fluid conduction bore; and wherein
    said at least one interconnecting port bore is disposed proximate a first end of said block; and
    said at least one other interconnecting port bore is disposed proximate a second end of said block.

8. A port array block according to claim 6, wherein said at least one interconnecting port bore is embodied in a single, straight, uniform diameter bore at least partially through said block.

9. A port array block according to claim 8, wherein at least one of said first plurality of insert bores and an associated one of said second plurality of insert bores join to form a single bore through said block.

10. A port array block according to claim 1, comprising:
a plurality of fluid conduction bores, extending at least partially through said block;
a plurality of insert bores, each intersecting at least one of said plurality of fluid conduction bores and adapted to receive a configuration insert; and
a plurality of port bores, at least one of said port bores intersecting each of said plurality of fluid conduction bores between an adjacent pair of said insert bores, for providing fluid access to said plurality of fluid conduction bores.

11. A port array block according to claim 10, wherein said fluid conduction bores are parallel to one another.

12. A port array block according to claim 11, wherein said insert bores are perpendicular to said fluid conduction bores.

13. A port array block according to claim 12, wherein each of said insert bores intersects two of said fluid conduction bores and is adapted to receive two configuration inserts.

14. A port array block according to claim 13, wherein at least one of said port bores intersects at least two of said fluid conduction bores.

15. A port array block according to claim 14, wherein said at least one of said port bores is embodied in a single, straight bore at least partially through said block, said single bore intersecting at least two fluid conduction bores.

16. A port array comprising:
a block having a first fluid conduction bore at least partially through said block, a plurality of insert bores, each of said insert bores intersecting said first fluid conduction bore and adapted to receive a configuration insert, and a plurality of port bores for providing fluid communication with said first fluid conduction bore, at least one of said first plurality of port bores intersecting said first fluid conduction bore between an adjacent pair of said insert bores; and
a plurality of configuration inserts, each fixed in one of said insert bores.

17. A port array according to claim 16, wherein at least one of said configuration inserts is a cap.

18. A port array according to claim 16, wherein at least one of said configuration inserts is a plug.

19. A port array according to claim 16, wherein at least one of said configuration inserts comprises a device seat.

20. A port array according to claim 19, further comprising a plug, seated in said device seat and operative to block fluid flow through said first fluid conduction bore.

21. A port array according to claim 19, further comprising a cap, seated in said device seat and operative to occlude the external opening of said insert bore and to facilitate fluid flow through said first fluid conduction bore.

22. A port array according to claim 19, further comprising a valve, seated in said device seat and operative to selectively block fluid flow through said first fluid conduction bore.

23. A port array according to claim 19, further comprising a transducer, seated in said device seat and operative to generate a signal responsive to a physical property of fluid flow through said first fluid conduction bore.

24. A port array according to claim 19, wherein said device seat comprises:
a body for partitioning said fluid conduction bore into a first manifold and a second manifold;
an internal chamber defined at least partially by said body;
a first passageway connecting said first manifold with said internal chamber;
a second passageway connecting said second manifold with said internal chamber; and
an opening into said internal chamber defined by said body, and adapted to receive a configuration device.

25. A port array according to claim 24, further comprising a configuration device fixed in said opening of said device seat.

26. A port array according to claim 25, wherein said configuration device comprises a cap adapted to seal said opening and to facilitate fluid flow through said internal chamber.

27. A port array according to claim 25, wherein said configuration device comprises a plug adapted to seal said opening and to occlude one of said first passage and said second passage.

28. A port array according to claim 25, wherein said configuration device comprises a valve adapted to seal said opening and to selectively occlude one of said first passage and said second passage.

29. A port array according to claim 25, wherein said configuration device comprises a transducer, adapted to seal said opening and operative to generate a signal responsive to a physical property of a fluid in said internal chamber.

30. A port array according to claim 16, wherein at least one of said configuration inserts comprises:
a body for partitioning said first fluid conduction bore into a first manifold and a second manifold;
a passageway, through said body, connecting said first manifold with said second manifold.

31. A port array according to claim 16, further comprising:
a second fluid conduction bore at least partially through said block;
a second plurality of insert bores, each of said second plurality of insert bores intersecting said second fluid conduction bore and adapted to receive a configuration insert;
a second plurality of port bores for providing fluid communication with said second fluid conduction bore, at least one of said second plurality of port bores intersecting said second fluid conduction bore between an adjacent pair of said second plurality of insert bores; and
a second plurality of configuration inserts, each fixed in one of said second plurality of insert bores.

32. A port array according to claim 31, wherein at least one of said first plurality of insert bores and an associated one of said second plurality of insert bores join to form a single bore through said block.

33. A port array according to claim 32, wherein said configuration insert fixed in said one of said first plurality of insert bores and said configuration insert fixed in said associated one of said second plurality of insert bores are included in a single configuration insert disposed in said single bore through said block.

34. A port array according to claim 32, wherein at least one of said configuration inserts comprises a device seat.

35. A port array according to claim 34, wherein said device seat comprises:
a body for partitioning said first fluid conduction bore into a first manifold and a second manifold;
an internal chamber defined at least partially by said body;
a first passageway connecting said first manifold with said internal chamber;
a second passageway connecting said second manifold with said internal chamber; and
an opening into said internal chamber defined by said body, and adapted to receive a configuration device.

36. A port array according to claim 32, wherein at least one of said configuration inserts comprises:
   a body for partitioning said first fluid conduction bore into a first manifold and a second manifold;
   a passageway, through said body, connecting said first manifold with said second manifold.

37. A port array according to claim 32, wherein at least one of said configuration inserts comprises:
   a body for partitioning said first fluid conduction bore into a first manifold and a second manifold;
   a passageway, through said body, connecting said first manifold with said insert bore.

38. A port array block comprising:
   a plurality of fluid conduction bores extending at least partially through said block;
   a plurality of insert bores extending completely through said block, each of said insert bores intersecting two of said fluid conduction bores and adapted to receive two configuration inserts;
   a first port bore extending at least partially through said block and intersecting two of said fluid conduction bores, so as to form a manifold together with the portions of said two fluid conduction bores intersecting said first port bore; and
   a second port bore extending at least partially through said block and intersecting two of said fluid conduction bores, so as to form a manifold together with the portions of said two fluid conduction bores intersecting said second port bore.

39. A port array block according to claim 38, wherein:
   said first port bore is disposed proximate a first end of said block; and
   said second port bore is disposed proximate a second end of said block.

* * * * *

UNITED STATES PATENT AND TRADEMARK OFFICE
CERTIFICATE OF CORRECTION

PATENT NO.   : 6,374,861 B1
DATED        : April 23, 2002
INVENTOR(S)  : Johnson It is certified that error appears in the above-identified patent and that said Letters Patent is hereby corrected as shown below:

<u>Title page,</u>
Item [73], Assignee should read -- Chemand Corporation, San Jose, CA --.

Signed and Sealed this

Fourteenth Day of January, 2003

JAMES E. ROGAN
*Director of the United States Patent and Trademark Office*